J. Kelly,
Bush for Tackle Block.

N° 15,886.    Patented Oct. 14, 1856.

UNITED STATES PATENT OFFICE.

JAMES KELLY, OF SAG HARBOR, NEW YORK.

ANTIFRICTION-BUSHING FOR SHIPS' BLOCKS.

Specification of Letters Patent No. 15,886, dated October 14, 1856.

*To all whom it may concern:*

Figure 1:
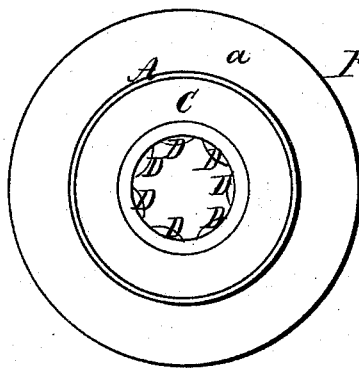
Figure 2:
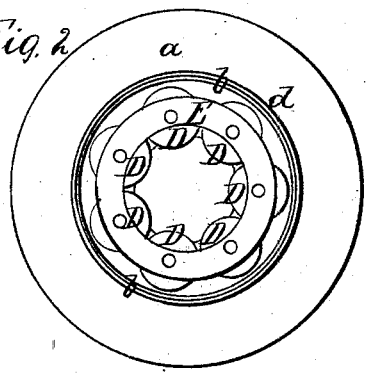
Figure 3:
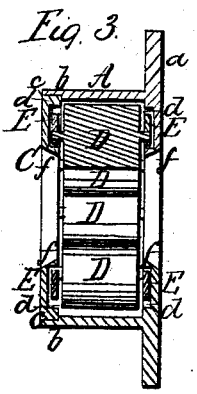

Be it known that I, JAMES KELLY, of Sag Harbor, in the county of Suffolk and State of New York, have invented a new and Improved Antifriction-Bush for Ships' Blocks and for other Purposes; and I do hereby declare that the following is a full and exact description thereof, reference being had to the accompanying drawings, making a part of this specification, Figure 1 being a side view of the bush; Fig. 2, a similar view of the same, one end or head being removed; Fig. 3, a section through the center of the bush.

Like letters designate corresponding parts in all the figures.

There are several objections to antifriction bushes, as they are usually constructed.

First, the inner, or removable end of the box, is commonly placed against the open end of the side, or cylinder, and held in place by bolts passing through flanges projecting beyond the cylindrical part. This mode of constructing does not produce a strong nor a tight box or case.

Another objection is to the mode of arranging the anti-friction rollers; which are usually mounted in two rings at their ends. These rings are held together by bolts passing from one to the other, the rollers being made small enough to leave spaces therefor between them. By thus obliging the rollers to be made so small, the journal of the shaft, or pin, is liable to wear in upon one or more of the rollers, especially if anyone fails to revolve freely, and thus makes the bush inferior to an ordinary bearing. Another ill effect of this arrangement is that the spaces between the rollers allow sand and water to enter, so as to clog the bush, or when the water becomes frozen, to prevent the rollers turning.

A third objection to the usual construction of anti-friction bushes, is, that there is nothing to keep the rollers from wabbling; so that, as soon as they wear somewhat, in the box, they move about so irregularly and loosely as soon to render them unfit for use.

The object of my invention is to obviate the above objections; and it consists in constructing the bush so as to make it strong and tight, whereby water and sand are almost entirely excluded; and so that the antifriction rollers are held firmly in their proper positions, but free to turn upon their axes, substantially as hereinafter set forth.

One head B, is cast in one piece with the cylindrical portion A, of the box, and projects beyond the same in the form of a flange $a$, for securing the bush to the block, or bearing, in the usual manner. A groove D, is formed in the inner edge of the cylinder A, leaving a shoulder within. After the rollers are placed within the box, the head C, is inserted into said groove $b$, against its shoulders; and the end of the cylinder is then closely riveted over it, as shown at $c$, Fig. 3. This produces a very strong box and tight so far as the connecting joint of the head and cylinder is concerned.

In the inside of each head, I form an annular groove $d$, just large enough for the reception of the ring E, at its end of the rollers D, D. These grooves keep the rings, and consequently the rollers, in their proper positions, preventing the rollers from wabbling about, but at the same time allowing them to turn freely. The inner edges $f$, $f$, of the heads B, C, extend in, nearly to the innermost tangents of the rollers. The rollers also fit closely to the heads and to each other, as nearly as possible and allow them to move freely. This entirely excludes sand; and prevents the entrance of water, in sufficient quantity to cause the rollers to freeze fast in the box, and the whole forms a strong, compact, and durable bush.

What I claim as my invention and desire to secure by Letters Patent, is—

The above described mode of constructing the bush, by riveting the head within the cylinder; and the annular grooves $a$, $a$, for the reception of the bearing rings E, E, of the rollers, for the purposes specified.

The above specification of my new and improved anti-friction bush for ships' blocks, signed and witnessed this 18th day of September, 1856.

JAMES KELLY.

Witnesses:
JAMES H. PRICE,
JOHN M. BYRAM.